United States Patent [19]

Landon et al.

[11] Patent Number: 5,247,901
[45] Date of Patent: Sep. 28, 1993

[54] CONTAINMENT SYSTEM FOR PROMOTING IMPROVED ANIMAL WELL-BEING

[75] Inventors: John C. Landon, Potomac; Joseph M. Erwin, Gaithersburg; John T. Steffes, Olney, all of Md.

[73] Assignee: Diagnon Corporation, Rockville, Md.

[21] Appl. No.: 896,123

[22] Filed: Jun. 11, 1992

[51] Int. Cl.$^5$ .......................... A01K 1/00; A01K 1/01
[52] U.S. Cl. ........................................ 119/15; 119/19; 119/16
[58] Field of Search ....................... 119/15, 16, 17, 19, 119/18

[56] References Cited

U.S. PATENT DOCUMENTS

| | | | |
|---|---|---|---|
| 3,367,308 | 2/1968 | Quattrone et al. | 119/15 |
| 3,467,064 | 9/1969 | Glass et al. | 119/17 |
| 3,651,786 | 3/1972 | Patterson et al. | 119/17 |
| 3,698,360 | 10/1972 | Rubricius | 119/17 |
| 3,760,768 | 9/1973 | Patterson | 119/17 |
| 3,830,201 | 8/1974 | Coulbourn | 119/17 |
| 3,918,406 | 11/1975 | Patterson | 119/96 |
| 4,016,833 | 4/1977 | Ray | 119/17 |
| 4,120,266 | 10/1978 | Oloff et al. | 119/103 |
| 4,365,590 | 12/1982 | Ruggieri et al. | 119/15 |
| 4,402,280 | 9/1983 | Thomas | 119/15 |
| 4,526,133 | 7/1985 | LoMaglio | 119/15 |
| 4,699,088 | 10/1987 | Murray et al. | 119/18 |
| 4,727,825 | 3/1988 | Houghton | 119/23 |
| 4,798,171 | 1/1989 | Peters et al. | 119/15 |
| 4,841,911 | 6/1989 | Houghton | 119/29 |
| 4,862,831 | 9/1989 | Graham | 119/15 |
| 4,951,609 | 8/1990 | Migler | 119/17 |
| 4,953,500 | 9/1990 | Savage-Rumbaugh | 119/17 |
| 5,000,120 | 3/1991 | Coiro, Sr. et al. | 119/15 |
| 5,036,795 | 8/1991 | Houghton | 119/17 |

FOREIGN PATENT DOCUMENTS 2103896  9/1972  Fed. Rep. of Germany ........ 119/19

OTHER PUBLICATIONS

NIH Contract NOI-AI-05069 (May 1990).
9-page letter and attachment-John Landon to Ms. Bruce et al. May 17, 1990.
"American Journal of Primatology", vol. 24, No. 2, 1991, for the Poster Presentation on Jun. 24-28, 1991 Meeting in Veracruz.

Primary Examiner—John G. Weiss
Attorney, Agent, or Firm—Beveridge, DeGrandi, Weilacher & Young

[57] ABSTRACT

A containment system useful for animal microbiological isolation containment including a plurality of two room suites combined into two suite containment units, selectively separable adjoining exercise runs for individual and group isolation, the suites being constructed of transparent, glass panels and stainless steel permitting caregiver observation, videographic recording, and visual and auditory contact with other confined animals even during periods of individual isolation. Furthermore, each suite features a sealed air circulation/ventilation system, broad spectrum lighting, sealable containment and shuttle doors, a squeeze back wall and actuator, as well as structures to facilitate sanitation, feeding, and servicing from an access corridor.

31 Claims, 6 Drawing Sheets

CONTAINMENT SYSTEM FOR PROMOTING IMPROVED ANIMAL WELL-BEING

TECHNICAL FIELD

This invention relates to an improved containment system for animals. More particularly, this invention relates to a containment unit structure which provides much improved facilities for a confined animal's well-being, and is especially applicable to the well-being of non-human primates subject to microbiological isolation.

BACKGROUND OF THE INVENTION

In facilities for animal care, e.g., zoological parks, research centers, and veterinary hospitals, occasions arise requiring isolation of animals from one another. Particularly when infectious disease or biohazards are involved, prolonged periods of confinement are essential since contact between different animals may lead to cross-contamination. Cages used for animal containment in zoological parks, veterinary hospitals, animal research facilities, and the like, traditionally comprise a square or rectangular floor with vertical bars defining side walls and a barred ceiling. Typically the prior art cages are small, box-like, and restrictive, thus, potentially compromising the psychosocial well-being and physiological responses of the caged animals.

In the case of non-human primates, particularly when very young, prolonged individual housing in small cages that do not afford visual access to conspecifics or offer opportunities for environmental control and recreation tend to result in a variety of abnormal patterns of behavior. The occurrence abnormal patterns of behavior can be used as an indicator of a lack of psychological well-being. The provision of environmental features that allow expression of the species typical activities has been shown to reduce the development or expression of abnormal patterns of behavior. Environments that provide opportunities for social interaction and environmental control appear to be most beneficial in promoting psychosocial well-being. Consequently, caregivers are often faced with abnormal primate behavior and developmental problems resulting from confinement in inadequate environments.

When non-human primates are subject to microbiological isolation in a conventional isolation cage for quarantine and the like, the problems are further augmented. To achieve isolation, commonly, the cage is placed in an isolation room or compartment which further limits contact with other animals and/or external stimuli.

Another problem with traditional caging systems relates to maintenance and sanitation. The maintenance process requires the caregiver to remove the confined animal from the cage to a holding cage for cleaning. Microbiological isolation adds further demands. In quarantine or isolation situations, it is undesirable for an animal to be subject to prolonged contact with the caregiver or other ambient biological influences during necessary activities such as cleaning and maintenance. This requires the animal to be transferred to a separate of holding cage through or in a "clean" room which must be scrupulously maintained. Additionally, this process requires the separate or holding cage to be microbiologically clean. Furthermore, depending on the nature of the disease, it may be necessary for the caregiver to maintain two separate cages exclusively for each animal to minimize the risk of communicating the biohazard agent from one animal to another via the "clean" room. Clearly, such activity constitutes an inefficient use of resources since the routine labor involved and facilities required unnecessarily burden the caregiving facility. Moreover, the process, itself, poses unnecessary risk of contamination from transferred contagions and infectious diseases.

Another problem common to traditional caging systems concerns access to the caged animal. In traditional caging systems, when handling the caged animal, it is often necessary for the caregiver to enter the cage or use adjuncts such as prods, dart guns, or capture nets. For handling of dangerous animals, such as lions, tigers, etc., the prior art teaches the use of squeeze-back type mechanisms such as that illustrated in U.S. Pat. No. 3,918,406. To minimize direct contact of the caregiver to the animal and to achieve the objective of handling the caged animal, U.S. Pat. No. 3,918,406 describes a system operated by an articulable lever assembly located outside the cage to move an entire side wall of the cage toward the opposite wall for "squeezing" the animal toward and through an opening. An easily accessible handle for operating the mechanism, may prove dangerous if improperly actuated by a confined animal, e.g., a primate. Furthermore, in the case of microbiological isolation and a sealed confinement chamber, such a structure may be impractical. It would be desirable to have a squeeze back device for handling the animal within the isolation cage and particularly providing a device which is 1) contained within the structure, 2) easy to manipulate and 3) does not present danger to the occupant animal.

With reference to danger to the animal, it is desirable in the animal containment discipline, to avoid use of machinery, equipment, power sources, and other adjuncts within a cage or which is accessible to the confined animal.

SUMMARY OF THE INVENTION

It is therefore an object of the present invention to overcome the problems associated with the prior art.

It is another object of this invention to provide a replacement for traditional caging systems.

It is further object of this invention to provide an animal containment system which promotes the psychological well-being of the confined animal.

It is another object of this invention to provide an containment system particularly suitable for primates.

Still another object of this invention is to provide an animal containment system capable of microbiological isolation.

Another object of this invention is to provide air flow and temperature regulation.

A further object of this invention is to provide a primate confinement system permitting social interaction between isolated primates.

Yet another object of this invention is to minimize uncontrolled exposure of confined animals to ambient biological influences, infectious disease, and other biohazards.

Still another object of this invention is to meet government regulations.

Another object of this invention is to provide a containment system facilitating maintenance.

Still another object of this invention is to provide access structures permitting caregiver access and animal retrieval while providing the capability for use requiring microbiological isolation.

A further object of this invention is to provide for inter-chamber communication of animals.

These and other objects are satisfied by an animal containment system, comprising a) a first chamber having a first containment door and a first shuttle opening;

b) a second chamber contiguous with said first chamber and having a second shuttle opening corresponding to said first shuttle opening of the first chamber and a third shuttle opening;

c) a third chamber contiguous with said second chamber and having a fourth shuttle opening corresponding with said third shuttle opening and a fifth shuttle opening;

d) a fourth chamber contiguous with said third chamber and having sixth shuttle opening corresponding to said fifth shuttle opening and a second containment door; and e) an accessway disposed between said first and fourth chambers into which said first and second containment doors open;

where each of the chambers is defined by vertical walls, a floor and a ceiling.

Still other objects are satisfied by an animal containment system, comprising a) a base defining a selected area;

b) a subfloor contained within said base and formed of a non-permeable material and defines a surface angled toward an outlet for flushing;

c) a floor, said floor overlying said subfloor;

d) side walls secured to and projecting upwardly from said base to a selected height, said side walls incorporating selected portions of solid, non-permeable, transparent materials and other portions incorporating opaque, solid privacy panels;

e) a ceiling secured to said side walls, said ceiling being formed of non-permeable, solid, panel members where said base, subfloor, floor, walls and ceiling define a chamber;

f) air vent means for providing air circulation within the chamber, said air vent means being disposed in said ceiling; and g) at least one access door to said chamber formed in one of said walls.

Further objects of the invention are satisfied by an air circulation system for microbiological isolation of animals contained in a chamber, comprising:

a) a sealable chamber defined by a floor, side walls incorporating solid transparent portions, a ceiling including a sealed light source, and a sealable containment door for animal access to said chamber;

b) an air source including an intake;

c) a plenum for permitting control of air pressure within the chamber;

d) means for communicating air between said chamber and air source;

e) air filter means disposed between said air source and said chamber for filtering air introduced to the chamber f) an air vent formed in the ceiling of said chamber;

g) air exhaust means for exhausting air from the chamber; and h) air pressure control means for controlling the air pressure within the chamber.

Objects of this invention relating to animal handling are satisfied, in part, by an internal, movable wall system for placement in an animal containment chamber including a first wall, a floor, a ceiling, a proximate wall, and an opening in the second wall for introducing or removing animals therefrom, said movable wall system comprising:

a track disposed proximate to the ceiling of the chamber and extending between said first and second walls;

a guide means disposed between said track and said floor and transecting said chamber;

panel means dimensioned to conform to said second wall and substantially larger than the opening;

trolley means mounted to said panel and movably secured within said track to permit movement of said panel relative to said track and the second wall;

receiving means formed in said panel for receiving said guide means and permitting translation of said panel relative to said guide means;

actuation means for translating said panel along said track, said actuation means being connected to said panel and slidably attached to said guide means where activating said actuation means moves the panel from a first neutral position to a second active position where the panel forces an animal through the opening in the second wall and from the containment chamber.

Objects of the invention relating to inter-chamber communication of animals are satisfied by a shuttle door system for primate isolation confinement chambers, comprising:

two chambers separated by a wall;

an opening in the wall of selected height and width sufficient for a primate to move between the chambers;

tracks positioned proximate to the opening and of a length extending approximately twice the height of said opening;

a door translatable along said tracks between a first closed position where the door blocks the opening and a second open position where the opening is unblocked, said door being dimensioned to correspond with said opening;

electrically actuated means to translate the door between said first and second positions, said electric actuated means including a reciprocating piston connected to an arm which is pivotally connected to the door where the arm and piston articulate when said electrically actuated means is actuated to translate said door along said tracks;

control means for controlling the electrically actuated means including feedback means for preventing translation of said door in said track when a threshold resistance is exceeded.

Further objects of this invention relating to access to a containment chamber are satisfied by a door for a containment chamber, comprising:

a main frame for seating in a wall, said frame having a selected height, depth, and width and defining an interior periphery of selected dimensions;

an access door hingedly mounted to said main frame for pivoting between an open and closed position and having a height and width corresponding to the interior periphery of said main frame, said access door including locking means for locking said access door to said main frame, and a transit door translatable in a plane parallel to said access door for moving between a closed position to an open position providing an opening of sufficient size to permit movement of an animal therethrough, means for applying force to translate said transit door relative to said access door, and means for lockably securing said transit door in said closed position; and a panel door hingedly mounted to said main frame for pivoting between an open and closed position and having a panel frame of a height and width corresponding to the interior periphery of said main frame, said panel door including, a planar, solid panel, a vent panel, and locking means for locking said panel door to said main frame.

Objects relating to chamber maintenance are satisfied by providing an animal containment chamber having a floor where the floor is a grate composed of plastic coated aluminum and further comprising a base for each of the first through fourth chambers, said base including a non-permeable subfloor angled to a sealable waste feedthrough outlet formed in the base to said accessway and said floor being suspended on said base above said subfloor.

The invention concerns a revolutionary concept in containment of animals. This invention is particularly useful for containment of non-human primates and even more so when microbiological isolation is required. The inventive containment system is established by a plurality of selectively isolatable suites which are capable of being pneumatically sealed (air tight) except for controlled air circulation and pressure provided by intake and exhaust filters and ports. The arrangement of the suites and other features described below provide a capacity for total containment, when desirable, to protect the confined animal against the introduction of additional disease or biohazards and to protect other animals, such as chimpanzees, from cross contamination or unintentional exposure to disease agents. The suites define spacious enclosures which promote management flexibility and provide for enhanced physical exercise and social stimulation.

Many subsystems are incorporated into the overall containment system that are adaptable to conventional caging systems for animals. These sub-systems are applicable to and can enhance various conventional facilities as currently used in zoological parks, veterinary clinics, etc. Moreover, while the system can be permanent, it is also suitable for modularizing and transportability.

The preferred, illustrated system of this invention, as detailed, is directed to a non-human primate, multi-containment suite, microbiological isolation system.

Each suite provides biological containment, management flexibility, and opportunities for psychosocial enrichment. Each suite contains two rooms, a night feeding chamber and an adjoining recreational or day chamber. Two suites are combined into a containment unit with a common service area. Each suite is separately containable with filtered air intake and HEPA filtered exhaust. The environments are constructed of easily sanitizable materials, including stainless steel, high density polyethylene, laminated glass, acrylic plastic sheet, and PVC Plastisol coated aluminum. Each night feeding chamber contains a movable "squeeze-back" wall, a T-shaped bench, overhead bars, and a swing to promote use of vertical space and facilitate species-typical brachiation. Privacy panels allow opportunities for self-regulation of social exposure. Each suite includes containment doors between the chambers and service corridors as well as electrically controlled shuttle doors between the chambers to provide controlled access between rooms and runs.

By opening shuttle doors between suites, a greater area is made available to individual animals or groups of animals. The suites are designed specifically to provide a modular, physical environment enhancing management flexibility and promoting the psychological well-being of confined animals, e.g., chimpanzees. Furthermore, by opening the shuttle door, the animal can be placed in the recreation chamber and the door closed while the night/feeding chamber is cleaned by the caregiver who accesses the chamber through the containment door. Correspondingly, the shuttle door can be closed while the animal is in the night/feeding chamber to permit the caregiver to clean the recreational chamber which is accessed through a containment door associated with the recreational chamber.

The sub-systems are combined to provide a radically new animal/primate maintenance facility directed to the psychological, social, and physical well-being of the confined animal. The sub-systems include: 1) interconnected, selectively-isolatable containment suites comprising two interconnected chambers (rooms) with controlled access via openings sealable by shuttle doors; 2) mechanized, safety stop, sealable, shuttle doors associated with certain openings; 3) containment doors for caregiver access to the chambers and for accessing the animal; 4) a sanitation/cleaning system which can incorporate a closed sewage disposal system; 5) a novel squeeze-back, translatable wall actuation system for animal retrieval from a confinement chamber; and 6) an air filtration and distribution system with positive/negative air pressure control capability.

The invention should become clear to the person having ordinary skill in the art upon review of the drawings and the following detailed description thereof.

BEST MODE FOR CARRYING OUT THE INVENTION

The preferred embodiment according to the invention, a microbiological containment system 10 particularly directed for non-human primates, is illustrated in FIGS. 1-23.

The Overall Containment System

The illustrated embodiment of the microbiological confinement system 10 includes twelve generally L-shaped suites 12, each suite 12 containing two chambers, one designated the night/feeding chamber 14 and the other designated the day/recreation chamber 16.

The suites 12 are divided into two banks of units separated by a common main service corridor 18. The main service corridor 18, desirably, is provided with a secure access door to limit access to containment system 10 only to authorized caregiving personnel. It is preferred that the containment system 10 be flanked by observation corridors along the exterior of the day/recreation chambers 16, if space is available.

The suites 12, preferably, are associated in pairs to define containment units for housing two animals and which share a common, sealable service corridor/accessway 20 branching from the main service corridor 18. Each of the two suite, U-shaped units comprise five discrete areas, two chambers 14, two chambers 16, and an accessway 20, which when combined, form a generally rectangular confinement unit capable of housing two animals.

The units are openable to adjacent units via shuttle doors 24 which connect recreation chambers 16. This arrangement gives to a caregiver significant facility management flexibility since the caregiver may seal all of the chambers, may open selected chambers to one another, or may open all of the chambers to one another. When all the shuttle doors 24 of the day recreation chambers 16 are opened, the interconnected chambers 16 form a very substantial recreation run extending and connecting to a recreation room 22. Therefore, depending on the particular requirements of the caregiver, each of the chambers 14 and 16 of the containment suites 12 are selectively interconnectable and selectively-isolatable via the shuttle doors 24.

Each night/feeding chamber 16 preferably provides dimensions of approximately 26 square feet ($>2.33$ m$^2$) floor space and an internal height of about 90 inches ($>220$ cm). The day/recreation chambers 16 measure approximately 37.5 square feet ($\sim 3.4$ m$^2$) of floor space and 100 inches (about 225 cm) of internal height. When the shuttle doors 24 are opened, an animal may access to as much as 127 square feet of floor space, per unit. In the multi-unit arrangement depicted in FIG. 1, by opening the shuttle doors between all of the day chambers 16 on one side, a continuous run of over 45 linear feet (225 square feet of floor space) is provided. The extended run connects with a large playroom 22 located at one end of the containment unit 10. The playroom 22 provides over 400 square feet of floor space, a size sufficient for large children's playground equipment.

The shuttle doors 24 comprise a key feature of the overall invention because they permit selective separation or combination of the individual chambers. Since the contiguous recreation chambers 16 can be selectively opened to adjoining chambers 16 to establish an extended exercise run, the shuttle doors in the invention provide management flexibility to permit selective biological isolation of individual animals or selected group(s) of animals.

Another significant aspect of this invention is that the suites 12 provide safe, selectively isolatable living quarters while permitting constant visual and auditory contact with neighboring animals; even during periods of individual confinement. For this reason, the invention employs a combination of laminated (safety) glass panels and stainless steel panels set into steel framing. The laminated glass walls not only enhance animal-animal interaction but also provide unobstructed observation of the animals by caregivers and behavioral technicians and photographic/videographic documentation.

The invention provides both transparent and opaque panels to permit individual animals the choice of isolating themselves from others or exposing themselves to others. The provision of the laminated glass wall panels permit a confined animal to make constant visual observation in multiple directions. The suites feature certain opaque wall portions, on the other hand, to provide zones of privacy within the chambers 14 and 16.

The opaque "privacy panels" allow the animal to avoid observation, in certain directions from other confined animals, when desired and may be decorated with photographs or prints of scenes derived from the animal's natural habitat, thus further enriching the animal's environmental and psychological well-being. However, the privacy panels are positioned so as to provide a caregiver visual access to the animal at all times.

Details of the Containment Suites

Figure 1:
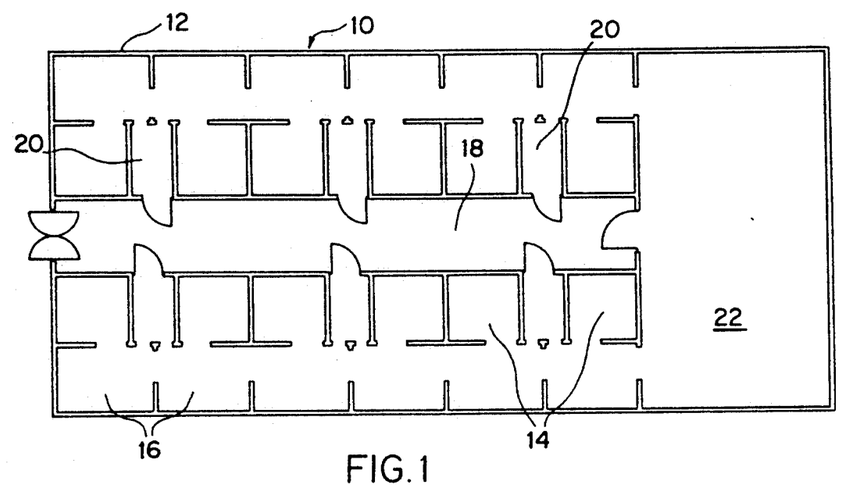
FIG. 1 is a plan view of a containment suite arrangement according to the invention.
Figure 2:
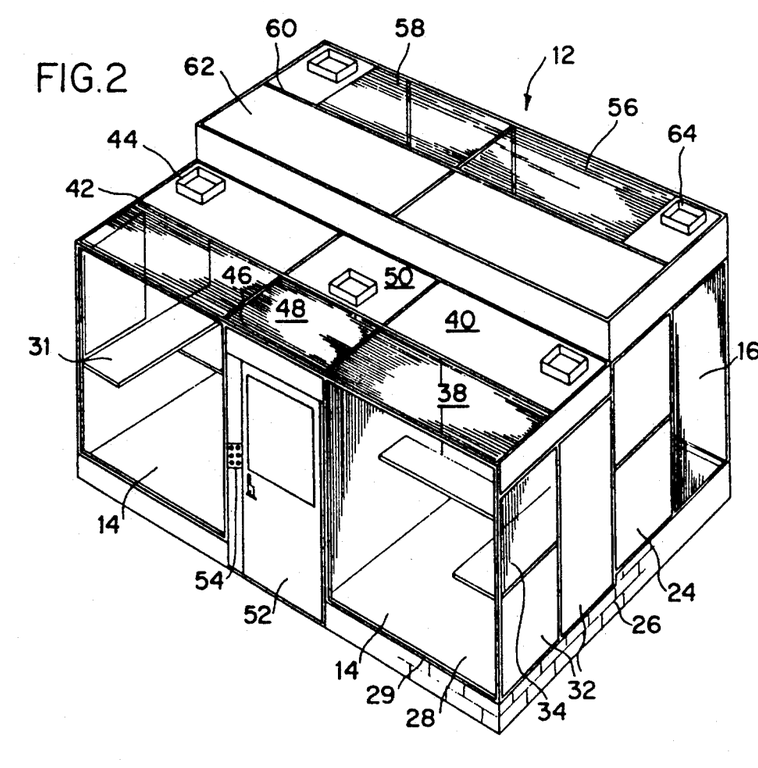
FIG. 2 is a perspective view of one set of containment suites according to the invention.
Figure 3:
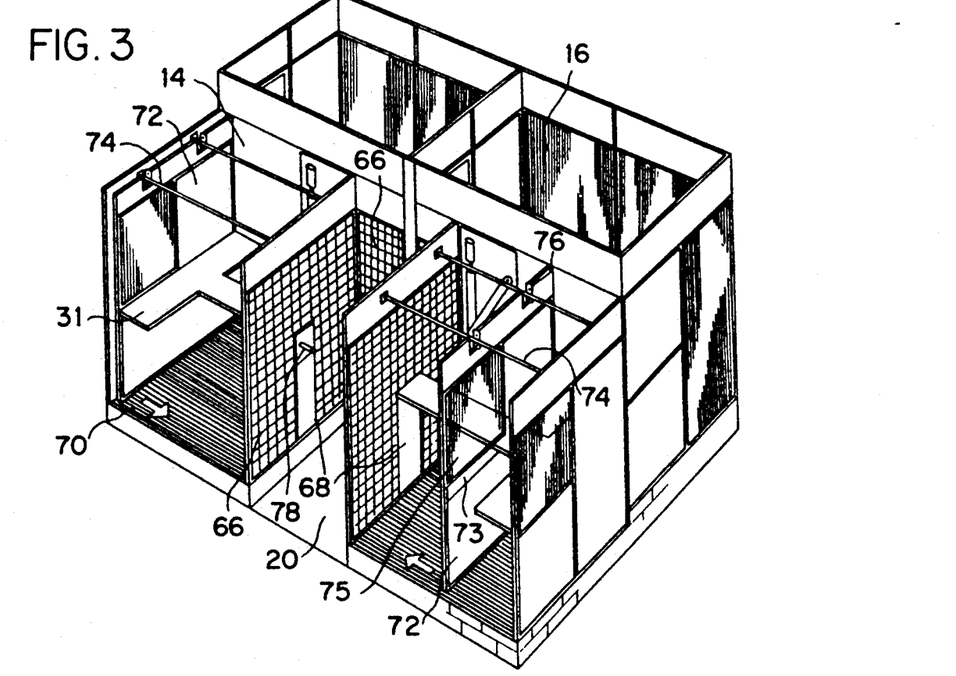
FIG. 3 is a perspective containment view of a containment suite joint according to the invention.
Figure 4:
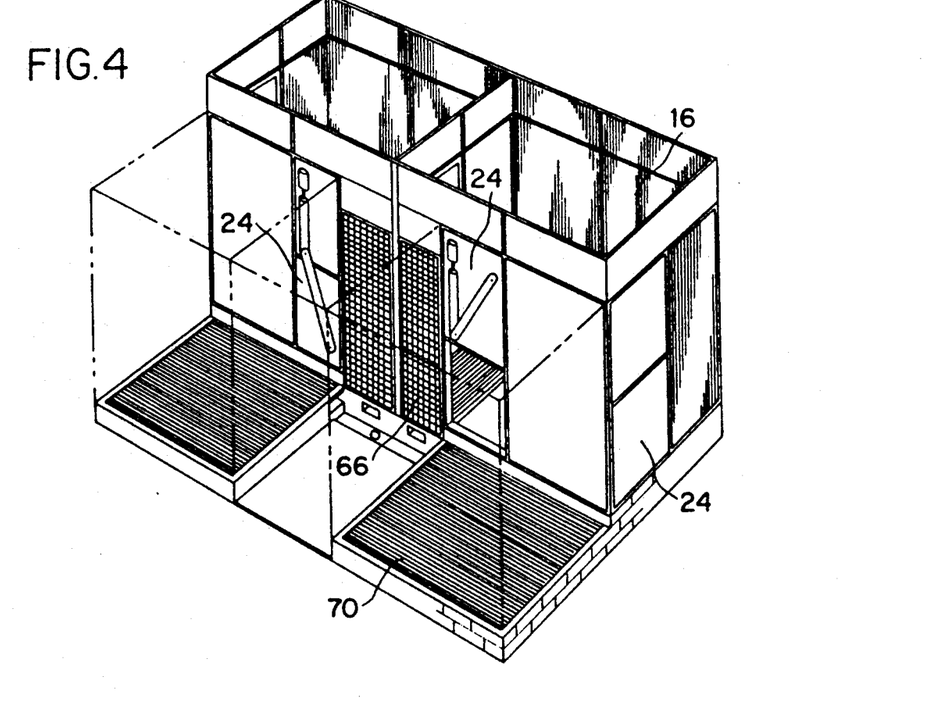
Figure 5:
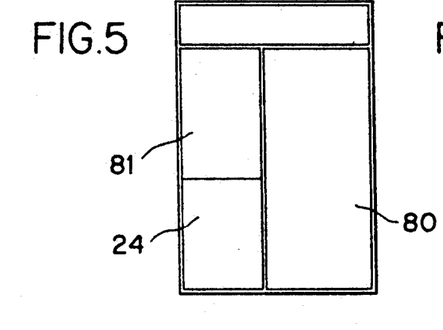
FIG. 5 is a side view of a solid wall of a day chamber according to this invention.

FIGS. 3, 4, and 5 respectively detail certain features of the night/feeding chambers 14 and day/recreational chambers 16. As illustrated, all of the chambers 14 and 16 include containment doors 66 formed in the walls between the chambers and service accessway/cove 20. Furthermore, shuttle doors 24 are located in the common walls between the chambers to provide inter-chamber communication.

The night/feeding chambers 14 and day/recreation chambers 16 are constructed on a cinder block and poured concrete base 26 and defined by steel framing and panels. The outer, side wall of each night/feeding chamber 14 includes angled steel framing into which is set a solid stainless steel panel 32 (3/16 inch thick) and a laminated glass panel 34 in an upper quadrant of the side wall for visual communication with an adjacent chamber. The front wall 28 of chamber 14 is formed from angle steel framing 29 into which laminated glass panels are set.

The ceiling of the chamber 14 includes a solid stainless steel panel 40 (3/16 inch thick) and a laminated glass panel 38 inset and sealed into angle steel framing 42. A broad spectrum light source is positioned above the glass panel 38 to provide adequate but diffuse lighting within chamber 14. The stainless steel panel 40 incorporates an air filter recess opening 44 for housing an HEPA (high efficiency particulate air) filter unit. The opening 44 is connected through a fan louvre control unit to a pneumatic communication manifold extending over the ceiling of the containment system 10 to a main air supply. Optionally, the air exhaust/intake filter may be associated with a fan.

Switches for controlling the louver and fan (air flow), are associated with individual suites and, preferably, for individual chambers at the entrance of the accessway 20 in control panel 54. The air flow master controls, preferably, are incorporated in master control panels remotely located from the suites, e.g., at the end of the main service corridor 18.

The service cove/accessway ceiling 46 includes clear laminated glass panel 48 corresponding in structure and function to the glass panel 38. A light source, preferably controlled by a dimmer switch located on the control panel 54, is suspended above glass panel 38. Likewise, the ceiling 46 incorporates a solid panel 50 (stainless steel or colored, stainless, laminate) also features a recessed air filter opening 44 corresponding in structure and function to that described above. A door 52 is provided in the entrance to the service accessway/cove 20 with appropriate gasketing disposed about the frame to allow the door 52 to seal the accessway 20 from the main service corridor 18. The door 52 may include a recessed filter vent housing similar to that used in the containment doors 66, described below. The frame of door 52, as noted, conveniently incorporates individual controls for lighting, airflow, and shuttle door actuation for each respective suite in the control panel 54.

The day/recreation chamber 16 includes a laminated glass back/observation wall, a wall contiguous with the night/feeding chamber 14 which includes a shuttle door 24, a containment door 66 contiguous with the service accessway 20, and sidewalls featuring a laminated glass panel, a stainless steel panel, and a shuttle door 24. The ceiling structure of chamber 16 corresponds to that of the chamber 14 insofar as it includes a stainless steel panel 62 with air filter recess openings 64 and clear laminated glass panels 56 and 58 inset into an angle steel frame 60.

Figure 6:
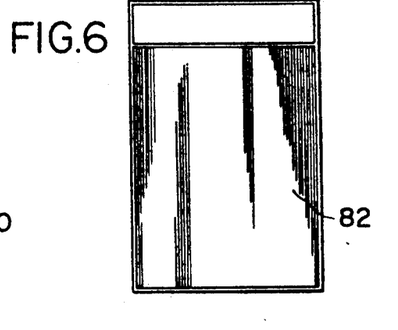
FIG. 6 is a side view of a finished end of a day chamber according to this invention.
Figures 7, 8, 9:
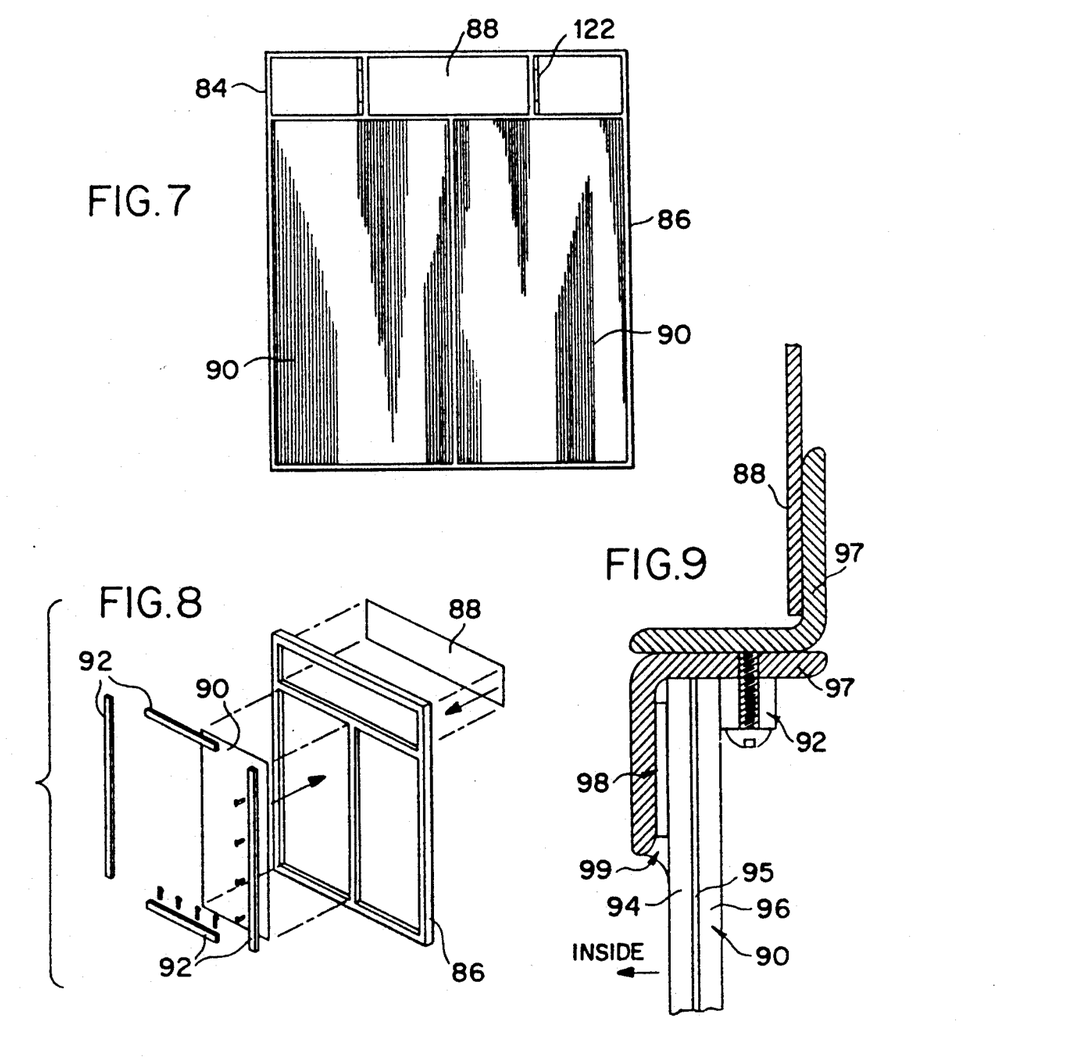
FIG. 7 is a front view of an observation panel associated with a day chamber according to the invention.
FIG. 8 is an exploded view of a wall assembly according to this invention.
FIG. 9 is a detailed view of the glass panel assembly for the observation wall panel.

FIGS. 5 through 9 illustrate particular structures and components preferred in the construction of the walls of the chambers. FIG. 5 depicts the structure of the side walls of chamber 16. Each side wall includes shuttle door 24, clear laminated glass panel 80, and opaque, stainless steel panel 81. FIG. 6 represents the front wall 28 of the chamber 14 which comprises a single laminated glass panel 82 sealed into steel framing. As illustrated in FIG. 7, the back wall 84 of the day chamber 16 includes two glass panels 90 and an upper stainless steel panel 88 inset into an angled steel frame 86. The back wall 84 constitutes an observation wall which is intended to be contiguous with an observation corridor, referred to above. The panel 88 incorporates trapezoidal attachment lugs 122.

In FIG. 8, the assembly of the wall 84 is depicted. The upper stainless steel sheet 88 is welded to the steel angle frame 86 and the laminated glass panels 90 are secured to the frame 86 using pre-drilled aluminum, retaining rods 92 which are screwed to pre-drilled frame 86. This arrangement facilitates replacement of damaged or broken panels. To replace a panel, the caregiver need only to unscrew the aluminum retaining rods 92 from frame 86, replace laminated glass panel 90, reposition the retaining rods 92, screw the rods 92 to the frame 86 and applying a bead of silicon caulk along the joints. In this manner, a new panel can be easily replaced and sealed without significant disruption to the animals, minimum disruption to operations, and no loss of the facility.

FIG. 9 details the structure of the sealed joint between laminated glass 90 and upper stainless steel panel 88. Two pieces of angled stainless steel 97 form the cross member/brace of frame 86 which are welded together to form an offset. The steel panel 88 is welded to the upper angled steel member and laminated glass panel 90 is secured to the lower section using double sided mounting tape 98 on the interior face of the lower angled steel member 97 and the aluminum retaining rods 92. The retaining rods, as described above, are screwed into pre-drilled holes in lower angle steel 97 to secure laminated glass 90 in the frame 86. Finally, a bead of silicon caulking 99 is applied in the gap between laminated glass plate 90 and angled steel 97 below mounting tape 98. This assembly is generally applicable to and used for mounting the glass wall panels throughout the system 10.

Referring to the preferred structure of the laminated glass sheets used for construction of the invention, a sheet of one-quarter inch tempered glass 94 is preferred for all interior facing surfaces. A thin acrylic sheet 95 is disposed and sealed between tampered glass 94 and a sheet of one-quarter inch plate glass 96 to provide a safety glass-type laminate which protects animals from flying shards of glass in the event a panel is shattered. Such glass meets the requirements of ASTM C-1036-90 and ASTM C-1172-91. When heat treated, the laminated glass meets the requirements of ASTM C-1048-90. The flat laminated glass also must meet the requirements of ANSI Z 97.1-1984, the CPSC standard for architectural glazing materials, and 16 C.F.R. §1201, categories 1 and 2. Such heat treated glass can be obtained for example from TempGlass, Inc. The flat glass is commercially available from, for example, Libby-Owens-Ford Corporation (LOF), Pittsburg Plate Glass (PPG), etc.

In the event a common wall between two chambers is formed by a glass panel, at least in part, the laminated glass may be modified to include two plates of tempered glass sandwiching an acrylic safety sheet to prevent breakage.

Figure 13:
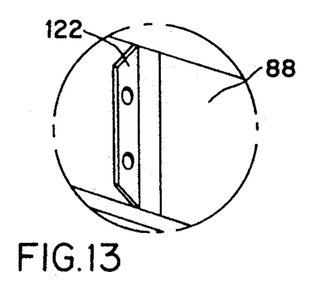
FIG. 13 is a perspective detail view of a beveled lug associated with the observation panel of FIG. 7.

FIG. 13 illustrates is a detailed illustration of trapezoidal lug 122 as attached to steel panel 88 along the upper portion of the walls in the containment system. The purpose of the lug is to provide for attachment of auxiliary devices such as swings, gymnastics-type devices, artificial trees, etc. These lugs are regularly spaced about the interior of the periphery of the chambers. The trapezoidal configuration avoids presenting sharp or jagged edges to the interior of the containment chamber.

Each night chamber contains a T-shaped resting bench 31 made of high density polyethylene. The resting bench 31 transects the chamber at a height above the floor to permit the animal to comfortably move about the entire floor. The resting bench 31 also conceals the squeeze back wall actuating guide rod 78 but permits translation thereover as described below. Each night chamber 14 also features the small, hinged, central feed door 68 opening to service accessway 20 for introducing food and water into the chamber 14. The feed door 68, preferably, opens to the space bordered by the bottom of the resting bench 31 and the chamber floor. The door 68 also provides ample access to the space in the chamber 14 for feeding, floor puzzles, foraging boards, grooming boards, simulated termite mounds, feed bins, water bottles, and other environmental enhancements in addition to the environmental enrichment devices placed in the chamber to promote physical activity (bars, swings, etc., attached to lugs 122).

The "Squeeze Back" Wall

Each night/feeding chamber 14 includes a movable "squeeze back" wall 72 to facilitate access to and safe manipulation of an animal contained in the chamber. The "squeeze back" wall 72 is mounted via rolling trolley 76 on parallel tracks 74 extending across the chamber 14. The tracks 74 preferably are stainless steel rods suspended below and parallel to the ceiling and perpendicular to the chamber/accessway wall. The rolling trolley 76 includes four, black nylon, channeled, wheels (two above and two below), sandwiched between two plates. One rolling trolley 76 is mounted on each of tracks 74 where the wheel channels journal the track and the squeeze back wall 72 is suspended from the tracks 74 by the trolleys 76.

The squeeze back wall 72 features opaque panels, a transparent panel, and a slot. More particularly, the wall 72 includes a lightweight frame bordering stainless steel paneling corresponding in position to chamber sidewall panels 32 and a clear panel 75 preferably formed of lightweight, non-breakable material such as polyacrylic sheeting (Lucite ® L) positionally corresponding to chamber sidewall glass panel 34. The movable wall 72 includes a horizontal slot 73 dimensioned and positioned so as to permit translation over the resting bench 31.

Figure 14:
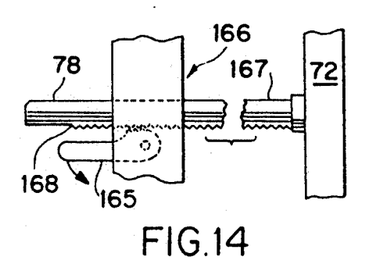
FIG. 14 is a partial assembly view of the squeeze-back wall control mechanism according to the invention.
Figure 15:
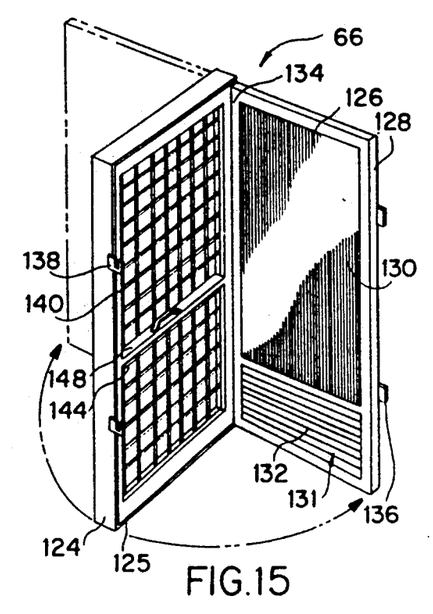
FIG. 15 is a perspective view of a containment door of the invention.

Referring to FIGS. 3 and 14, translation of the "squeeze back" wall 72 is effected by pulling rod handle 78. Guide rod handle 78 of guide rod 167 can be pulled into the service accessway 20, independent of the release of the squeeze back control mechanism 166. During retraction (pulling), the rod 78 projects into the service corridor/cove 20 above the feed door 68 and the squeeze back wall 72 translates across the night/feeding chamber 14 on tracks 74. Thus, the "squeeze back" wall 72 allows the caregiver to remotely manipulate and compel the animal to move towards transit door 144 by translating the wall 72 toward the service corridor/accessway 20.

The "squeeze back" mechanism 166 includes an elongated serrated stainless steel rod portion 167 with serrated teeth 168 affixed to squeeze back wall 72 and a spring-biased, pawl type release mechanism 165 mounted on the accessway wall. This mechanism must be released to return the squeeze back wall 72 to its neutral position (abutting the sidewall of the night/feeding chamber 14). Hence, by disengaging the control pawl 165 from the serrated teeth 168 and rotating the pawl 165 against the spring, in the direction of the arrow, the pawl is released from the serrations. This allows for guide rod handle 78 to be pushed until the squeeze back wall abuts the chamber sidewall. In the neutral position, the tracks 74, which define a set of parallel overhead bars may also be used to suspend a swing made of stainless steel and PVC pipe or used alone to promote brachiation.

To facilitate microbiological isolation, the handle 78 may be contained within a small gasketed box with a hinged door. Alternatively, an O-ring gasket dimensioned to journal guide rod 167, is secured in a feed-through formed above feed door 68 and in the wall between the night chamber 14 and the accessway 20.

The Shuttle Doors

Referring to FIGS. 4 and 20-23, shuttle doors 24 are illustrated. Shuttle doors permit controlled inter-chamber communication between chambers 14 and 16, and contiguous chambers 16, respectively. The shuttle doors 24 can be opened to provide a common run for all of the suites of a multi-unit row leading to the large, common playroom 22.

The "shuttle doors" 24 feature an electrically actuated, screw-type motor with the appropriate linkage to convert rotational to translational movement. For safety reasons, it is preferred that an active electric energy source for the shuttle door motor 154 not be present within the suites. Therefore, electrical power for activating the shuttle doors, preferably, is provided by a portable battery with low voltage which is connected to a remote plug-switch to operate each individual door 24. Such a plug/switch may be provided in the service accessway 20 or, preferably, is mounted in control box 54. Preferably, the plug/switch is an electrical socket for plug-in connection of the portable battery transported by the caregiver. When the respective shuttle door sockets for a particular suite are located in the control box 54, the caregiver can open and close the shuttle doors without the need for moving into the accessway 20 or about the chambers. Furthermore, as noted above, use of a portable battery pack avoids the need for live electrical wiring in the chamber confines and further avoids the presence of actuating switches which may be in reach of the animals.

The preferred door motor 154 for use with this invention features a slip clutch or resistance feedback circuit. The slip clutch/feedback circuit prevents both motor burnout and injury to an animal when translation is prevented by blockage or a mischievous animal. In other words, if an animal blocks the downward movement of shuttle door 24, the motor ceases to provide motive force for the door and thereby prevent injury to an animal that may be caught in the door. Such motors are commercially available as model No. 85151 from Motion Systems Corp. of Shrewsbury, N.J., which is a DC (direct current) actuator motor.

Turning now to FIGS. 20-23, they detail the construction and operation of the shuttle doors 24. The shuttle doors 24 are formed from 3/16-3/18 inch stainless steel panels set into steel frame 150 which includes a vertical track 152 for guiding the door 24 during translation. Electrically actuated induction motor 154 which incorporates a screw connected to a pivotal arm 156, powers the door to translate along the track 152. As the screw 153 is extended (see FIG. 23) arm 156 pivots relative thereto to cause door 24 to move vertically upward and provide a "shuttle" opening between chambers. Correspondingly, as screw 151 is retracted, arm 156 pivots so that door 24 translates downwardly to seal the "shuttle" opening. Preferably, the track 152 is bordered by closed cell foam gasketing 164 to provide a seal between chambers when the shuttle door 24 is in the closed position.

In order to minimize potential injury from physical contact with the door actuation apparatus, motor 154, screw 153 and arm 156 are all recessed within a box-like motor inset panel for recessing the motor and armature for actuation of shuttle door 24. In this manner when shuttle door 24 is opened, i.e., permitting communication of animals from chamber to chamber, the motor 154 is concealed behind the opened door.

Waste Disposal

Moving now to another significant aspect of this invention, it relates to a waste disposal sub-system. In order to prevent accumulation of trash, debris, excreta and other wastes leading to unsanitary conditions, the chamber floors are, preferably, formed in part, from foraminous grating.

Figures 10, 11, 12:
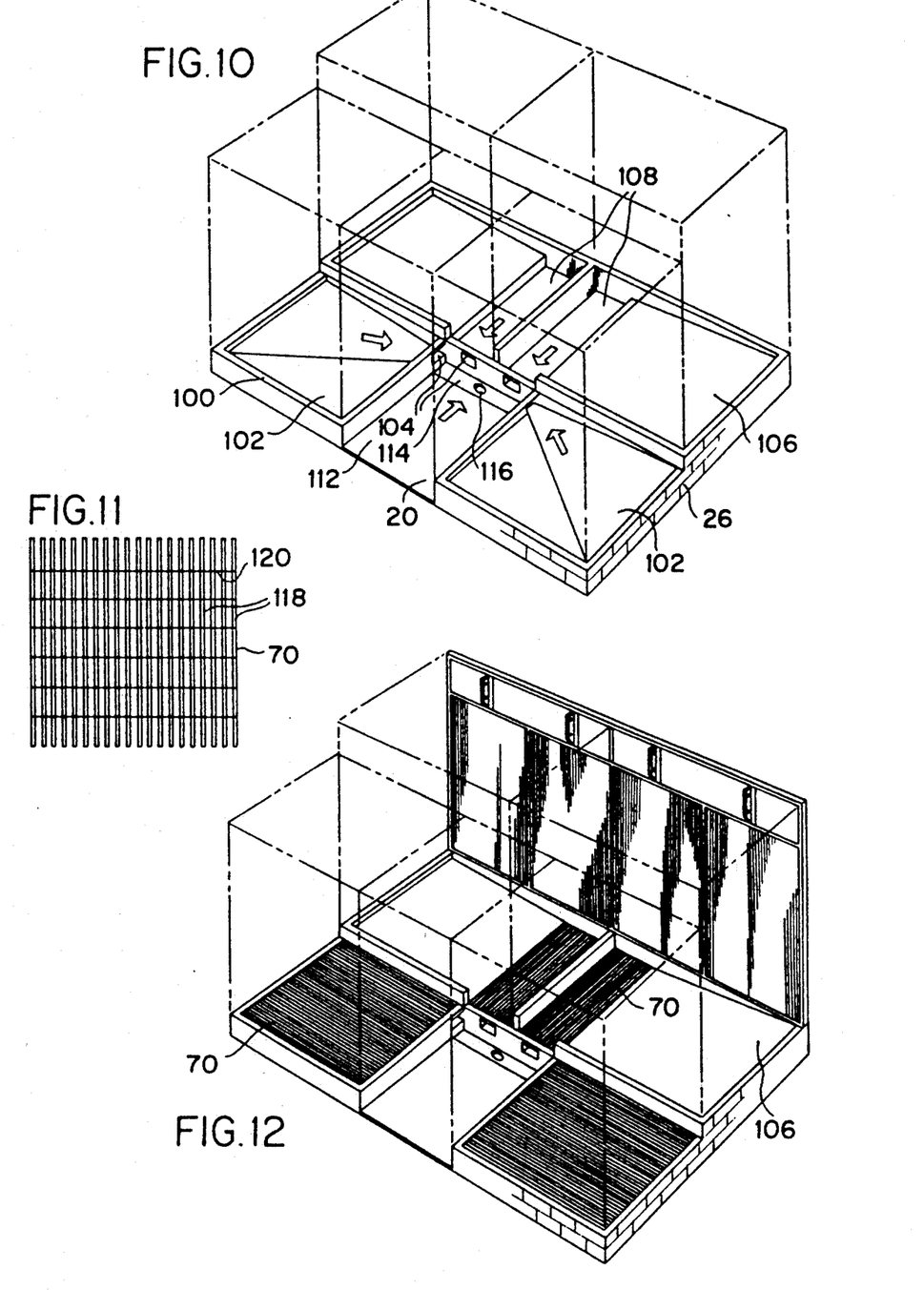
FIG. 10 is a perspective view of the containment suite sub-floor of FIG. 2.
FIG. 11 is a top view of the floor grate according to the invention.
FIG. 12 is a view of the grate of FIG. 11 as installed.

As depicted in FIGS. 10-12, both chambers of each suite include a plastic-coated, metal (aluminum) grate style flooring lying, in part, on the foundation wall perimeter and suspended over a canted moisture impervious (sealed) sub-floor preferably formed from poured and sealed concrete. The subfloors are canted sufficiently to promote gravity flow of liquids thereover for waste collection. Each chamber/subfloor features a sewage/cleaning port 104 to provide a disposal and drainage system for regular daily cleaning and periodic sanitizing by the caregiver. The sewage/cleaning access ports 104 are set into the cinder block base 26 and are contiguous with the lowermost portion of the subfloors. The sewage/cleaning access ports 104 includes latchable, hinged metal doors with non-moisture retaining gasket (closed-cell foam gasketing) for sealing each port. These doors are employed not only to provide microbiological isolation but also to control waste collection. The ports 104 are positioned to provide drainage of wastes from the subfloors into a waste trough 114 formed in the floor of the maintenance accessway 20.

According to the preferred cleaning method associated with the invention, chamber cleaning is achieved by flushing of animal wastes from the chamber with a water/cleaning solvent. The water/solvent is sprayed from a hose onto the walls, floors, etc. to collects dissolvable wastes, i.e. fecal matter, flows over the canted subfloors by gravity to and through the ports 104. The liquid then flows into the waste trough 114, which itself is canted to the drain 116, and down a drain 116 formed in the accessway floor. From the drain 116, the wastes may flow to a common sewage processing facility for ultimate disposal. Accordingly, waste containing fluids flow from the interior of the chamber, including the walls and floors, through the waste outlets 104, into the accessway drainage trough 114, and are removed through disposal drain 116.

The preferred structure of the flooring and sub-flooring as employed in the invention is described in greater detail in FIG. 10 which depicts the subflooring structure with ghosted outlines of the chamber walls. The drainage system 100 is formed within and bordered by the base 26. The night/feeding chamber 14 features a double angled subfloor which is canted at angles of approximately 8°-12° in the direction of the arrow to the waste outlet port 104 leading to service accessway 20. The day chamber 16, it features a solid, concrete floor 106 canted 6°-12° toward partial subfloor 108 which in turn, has a higher pitch 10°-15° toward the outlet port 104.

Both of night/feeding chamber angle subfloor 102 and, in part, the day/recreation partial subfloor 108 have a grate 70 suspended thereover. Grate 70, as illustrated in FIG. 11, is formed of a non-rusting material such as pressure locked rectangular bar aluminum which is coated with a synthetic resin such as polyvinyl chloride, (Plastisol ®). Preferably, the aluminum grating includes bearing bars 118 spaced apart approximately 3/16 inches on center and reinforcing crossbars spaced approximately 4 inches apart. This grating, while lending adequate foot support to the animal, provides for the flow of liquid and liquid waste through the openings formed therein and minimizes frictional resistance to flowthrough of waste and other materials from the top of the grate to the underlying subfloor.

For purposes of convenience, it is preferred that the entire night/feeding chamber floor comprise grate 70 to facilitate sanitization and a clean environment. However, since the amount of solid wastes are lesser than in the chamber 14, the day/recreational chamber 16 preferably features partial, solid floors 106 for sitting, playing, etc. Accordingly, the subfloor and grating 70 preferably, comprise only a strip portion of day chamber 16 floor. Preferably the subfloor/grating portion is contiguous to a containment door 66 and overlying an angle subfloor to the waste outlet 104.

The Containment Doors

To provided caretaker access to the chambers, containment doors 66 are provide in the walls of each chamber contiguous to the service accessway 20. The containment doors, preferably, are adapted to provide for microbiological isolation when necessary. Accordingly, the containment doors 66 are double gasketed with, for example, one inch wide closed-cell compressible acrylic foam gasket material or elastomeric D-shaped gaskets and provided with pressure locks.

Referring now to FIGS. 15-19, they detail the preferred construction of a containment door 66. The containment door 66 is defined by an outer rectangular frame 124 which includes a bevelled edge 125 on the surfaces facing the accessway, an outer door 126 and an inner door 140, both doors being pivotally mounted by recessed hinges 134 to the outer frame 124. The outer door 126 opens into the accessway 20 and the inner door 140 opens into the associated chamber.

Figure 16:
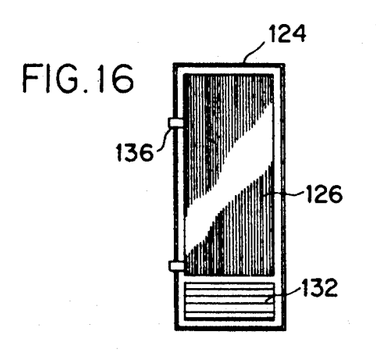
FIG. 16 is a front view of the outer door panel of the containment door.

The outer door 126 preferably includes stainless steel frame 128, clear laminated glass panel 130, filter housing vent 132 and closed cellfoam gasketing 131 which compresses into bevel 125 when the outer door 126 is closed against the outer frame 124. The filter housing vent 132 is configured for insertion of an HEPA sheet filter to provide for air intake or exhaust through the lower portion of the containment door 66. Two door latches 136 are affixed to the exterior of outer door 126 for compression latching and easy access by the caregiver in the service accessway 20. When outer door 126 is closed against outer frame 125, gasketing 132 compresses into the bevels 125 and the caregiver secures the door in this sealed (gasket compressed) position by rotating door latch 136 into hasp 138.

Figure 17:
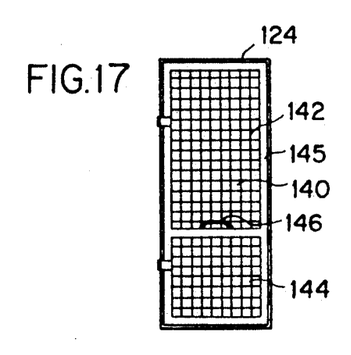
FIG. 17 is an inner door panel.
Figure 18:
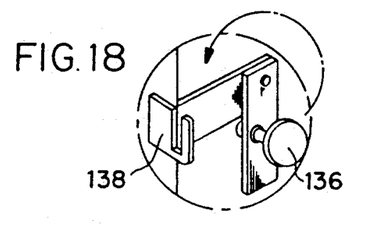
FIG. 18 is a perspective view of a door latch for a containment door structure according to the invention.

The inner door 140 is adapted for recessing within outer frame 124 and comprises a bifurcated wire mesh structure including a fixed upper wire mesh section 142 and a lower, wire mesh transit door 144. The fixed upper section 142 is defined by stainless steel wire mesh which is welded to angle steel frame 145. The lower, vertically translatable, wire mesh transit door 144 which translates with along a vertical track formed in the interior edge of frame 145. Translatable door 144 features a lift handle 146 to permit vertical translation to facilitate transfer of an animal between an independent transportation cage and the chamber. The caregiver opens the transit door 144 and urge the animal into the chamber from the cage or urges the animal from the night chamber 14 into the cage (with the assistance of the squeeze back wall 72).

Figure 19:
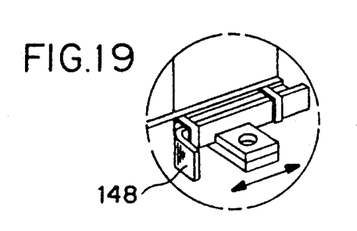
FIG. 19 is a perspective view of the access door latch for the inner door of the containment door structure.
Figure 20:
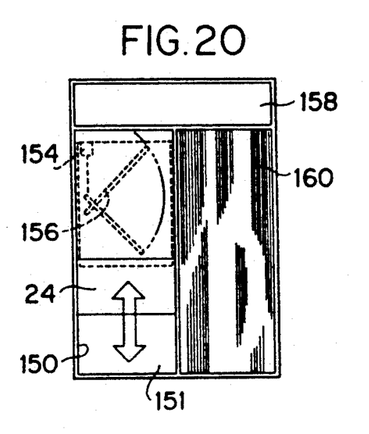
FIG. 20 is a detail, front view of the shuttle door.
Figure 21:
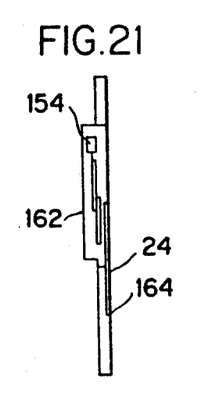
FIG. 21 is a side view of the shuttle door.
Figure 22:
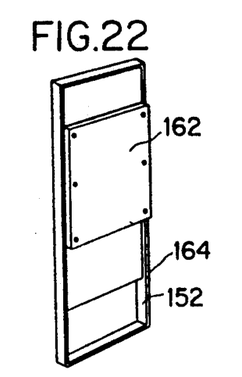
FIG. 22 is a rear view of the shuttle door.
Figure 23:
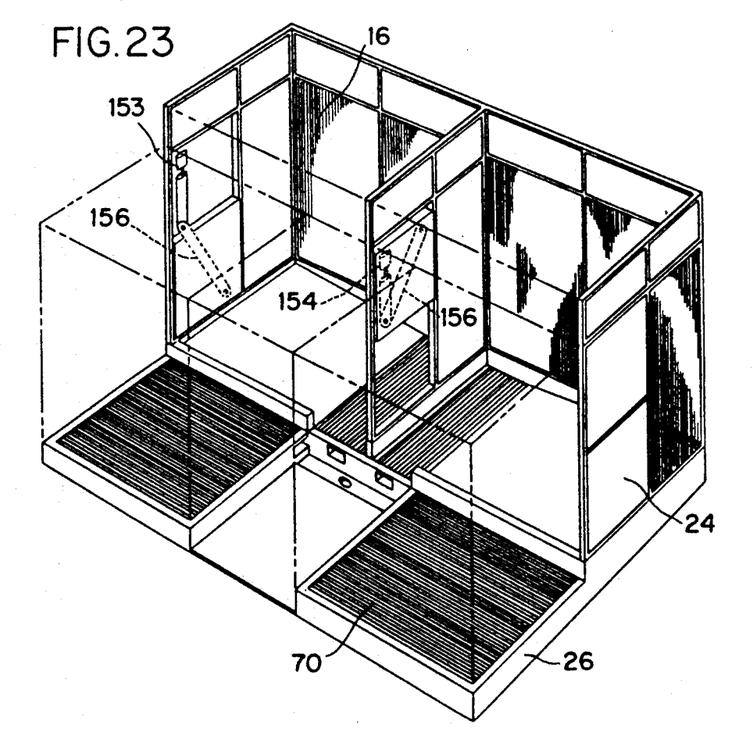
FIG. 23 is a perspective partial assembly view of the shuttle doors associated with the day recreation chambers.

In order to prevent accidental opening of transit door 146, it is provided with a hasp-type locking mechanism 148, depicted in FIG. 19. The hasp 148 is provided with conventional apertures for securement with the padlock to prevent unintended translation..

Air Flow Control and Ventilation

The condition of the air within each chamber is controlled by an air supply system. The system incorporates ducting, plenums, manifolds, fans, and filters which regulate temperature, humidity, air purity, and pressure within a sealed chamber. It is preferred to maintain negative pressure in the chamber In other words, the air flows from the accessway 20, through the containment door vent 132, into the chambers, and exhausted through the filtered recess in the chamber ceilings.

Each night chamber 14 and day chamber 16, preferably, incorporates individual ventilation controls on panel 54 The ventilation control system regulates the air flow through an HEPA filter recessed in the openings 44 and 64, respectively, in the chamber ceilings and the HEPA filter of the containment doors 66. Each ventilation control system, preferably, includes actuatable louvers controlling air flow from a air duct and reversible direction fans associated with each recess. The air flow rate and pressure is controlled through the plenum, the individual chamber fan, or the main system fan, and can be increased to provide a net positive pressure in the chamber or decreased for a net negative air pressure. This control capability is important to assure isolation according to requirements, e.g. for infectious or, conversely, specific pathogen free animals.

In the illustrated embodiment, the ducting and manifolds leading to the main system fan are located and accessible only from above the chamber.

It is generally preferred, but may be necessary, depending on location, that the ventilation system include air conditioning to maintain both temperature and humidity at desired levels. Air conditioning also provides the ability for acclimation for the particular species or selected animals.

Containment System Lighting

An indoor lighting facility is required to meet the needs of the contained animals. In this invention, it is preferred that an individual, automatic or manual dimmer-type, controlled broad spectrum lighting source be placed above each clear ceiling panel associated with the chambers 14 and 16 as well as accessway 20. Preferably, the light is provided in a range of frequencies corresponding to ambient light and should delivered by a diffused angle system so as to be adequate, not excessive. Full-spectrum lamps provide illumination at therapeutic intensities, preferably. It is also preferred that the light be provided in a regular and uniform manner.

The invention contemplates use of a fluorescent lighting fixture containing six 40-watt tubes is mounted above each chamber 14 and 16. The fixtures should be connected to the control panel 54 to provide switches permitting at least lighting levels (0, 2, 4, or 6 tubes on), with two dimmable tubes (2-40 watt) in the night/feeding chambers. The light should diffuse substantially uniformly throughout the chamber (no particularly dark or light spots) and be adjustable for clear visibility to allow for proper cleaning and maintenance.

Industrial Applicability

The invention herein provides a containment system for animals and is particularly applicable to primate maintenance in infectious disease studies and other applications requiring strict quarantine.

The invention comprises a modular, flexible physical environment adequate to promote the psychological well-being of animals and provides a superior capacity for biological containment, greater management flexibility, while increasing opportunities for social interaction, exercise, and expression of species-typical patterns of behavior by, for example, young chimpanzees.

Given the foregoing, variations and modifications to the invention should now be apparent to a person having ordinary skill in the art. These variations and modifications are intended to fall within the scope and spirit of the invention as defined by the following claims.

What is claimed is:

1. An animal containment system, comprising:
   a) a first chamber having a first containment door and a first shuttle opening;
   b) a second chamber contiguous with said first chamber and having a second shuttle opening corresponding to said first shuttle opening of the first chamber and a third shuttle opening;
   c) a third chamber contiguous with said second chamber and having a fourth shuttle opening corresponding with said third shuttle opening and a fifth shuttle opening;
   d) a fourth chamber contiguous with said third chamber and having sixth shuttle opening corresponding to said fifth shuttle opening and a second containment door; and
   e) an accessway disposed between said first and fourth chambers into which said first and second containment doors open;
   where each of the chambers is defined by vertical walls, a floor and a ceiling.

2. The animal containment system of claim 1 further comprising shuttle doors in said shuttle openings, gasket means for sealing said doors and openings and where each chamber is sealable to provide microbiological isolation.

3. The animal containment system of claim 2 further comprising electrically actuated shuttle doors disposed in said first and second, third and fourth, and fifth and sixth shuttle openings and said first and second, said third and fourth, and said fifth and sixth shuttle openings are common.

4. The animal containment system of claim 3 where each chamber has four walls and further comprising a base for each of the first through fourth chambers, said base including a non-permeable subfloor angled to a sealable waste feedthrough outlet formed in the base to said accessway.

5. The animal containment system of claim 4 further comprising a drain formed in the floor of said accessway where said accessway floor is angled to communicate wastes from said waste feedthroughs to said drain.

6. The animal containment system of claim 1 further comprising clear, laminated glass panels defining selected portions of the wall of said first, second, third, and fourth chambers to permit visual contact therebetween.

7. The animal containment system of claim 4 further comprising clear, laminated glass panels projecting vertically from said base and extending substantially to the respective chamber ceiling, each panel defining selected portions of the wall of said first, second, third, and fourth chambers to permit visual contact of each chamber.

8. The animal containment system of claim 1 where the floor of said first and fourth chambers is a plastic coated aluminum grate and further comprising a base for each of the first and fourth chambers, said base including a non-permeable subfloor angled to a sealable waste feedthrough outlet formed in the base to said accessway and said floor being suspended on said base above said subfloor.

9. The animal containment system of claim 2 further comprising a broad spectrum lighting source disposed above the ceiling of each of said chambers and a clear, colorless panel sealed into said chamber ceilings to permit passage of light from said light source into each chamber.

10. The animal containment system of claim 7 where the floor of said first and fourth chambers is a plastic coated aluminum grate and further comprising,
 a base for each of the first and fourth chambers, said base including a non-permeable subfloor angled to a sealable waste feedthrough outlet formed in the base to said accessway and said floor being suspended on said base above said subfloor, and
 a broad spectrum lighting source disposed above the ceiling of each of said chambers and a clear, laminated glass, sealed into said chamber ceilings to permit passage of light from said light source into each chamber.

11. The animal containment system of claim 1 further comprising a fifth through eighth chambers corresponding to said first through fourth chambers, and a seventh and eighth shuttle openings formed in said second and sixth chambers which correspond with each other and permit animal communication between said second and third chambers with said fifth and sixth chambers.

12. The animal containment system of claim 10 further comprising a fifth through eighth chambers corresponding to said first through fourth chambers, and a seventh and eighth shuttle openings formed in said second and sixth chambers which correspond with each other and permit animal communication between said second and third chambers with said fifth and sixth chambers.

13. The animal containment system of claim 1 further comprising movable squeeze-back wall means disposed within said first chamber, said squeeze-back means being translatable between a first neutral position and a second position substantially abutting the accessway opening.

14. The animal containment system of claim 12 further comprising movable squeeze-back wall means disposed within said fourth chamber, said squeeze-back means being translatable between a first neutral position and a second position substantially abutting the accessway opening.

15. The animal containment system of claim 10 further comprising movable squeeze-back wall means disposed within said first chamber, said squeeze-back means being translatable between a first neutral position and a second position substantially abutting the accessway opening.

16. The animal containment system of claim 2 further comprising a ventilation system including a sealed vent formed in the ceiling of said chambers, said sealed vent being connected to a manifold and including a high efficiency particulate air filter.

17. The animal containment system of claim 16 further comprising a plenum and air pressure control means for selectively controlling the air pressure within each chamber to create positive or negative air pressure relative to the ambient pressure.

18. The animal containment system of claim 10 further comprising a ventilation system including a sealed vent formed in the ceiling of said chambers, said sealed vent being connected to a manifold and including a high efficiency particulate air filter.

19. The animal containment system of claim 18 further comprising a plenum and air pressure control means for selectively controlling the air pressure within each chamber to create positive or negative air pressure relative to the ambient pressure.

20. The animal containment system of claim 2 further comprising a sealable door for sealing the entrance to said accessway and where said containment and shuttle doors are sealed with gasketing formed of compressible acrylic, closed-cell foam.

21. The animal containment system of claim 20 where the perimeter of said first through fourth chambers and said accessway defines a rectangle.

22. The animal containment system of claim 1 where said first and second chambers define a first containment suite and said third and fourth chambers define a second containment suite, said first and third chambers, respectively, defining night-feeding chambers and said second and fourth chambers defining day-recreation chambers.

23. The animal containment system of claim 1 further comprising a large recreation room for animal recreation sealably connected to said second chamber.

24. The animal containment system of claim 22 further comprising,
 movable squeeze-back wall means disposed within said first chamber, said squeeze-back means being translatable between a first neutral position and a second position substantially abutting the accessway opening, said squeeze back means including a guide shaft transecting said first chamber, and
 a resting bench element transecting said first chamber and covering said guide shaft.

25. The animal containment system of claim 1 further comprising a small door for providing food into said first chamber formed in the first chamber wall contiguous to said accessway and third and fourth containment doors formed in said second and third chambers, respectively, for access between said second and third chambers and said accessway.

26. The animal containment system of claim 1 further comprising third and fourth containment doors formed in said second and third chambers, respectively, for access between said second and third chambers and said accessway.

27. The animal containment system of claim 3 further comprising a shuttle door control and shuttle door electrical power source connection, said control and power source connection being located outside of said chambers.

28. The animal containment system of claim 26 where said containment doors include pressure locks.

29. The animal containment system, comprising:
 a) a first chamber having a first containment door opening and a shuttle opening;

b) a second chamber contiguous with said first chamber and having a shuttle opening common to the shuttle opening of the first chamber and a second shuttle opening;

c) a third chamber contiguous with said second chamber and having a shuttle opening common to the second shuttle opening and a third shuttle opening;

d) a fourth chamber contiguous with said third chamber and having shuttle opening common to third shuttle opening and a second containment door opening; and e) a service corridor disposed between said first and fourth chambers, said first and second containment door openings opening into said service corridor;

where each of the chambers is defined by vertical walls, a floor and a ceiling.

30. The animal containment system of claim 29 further comprising electrically actuated shuttle doors disposed in said first and second, third and fourth, and fifth and sixth shuttle openings and said first and second, said third and fourth, and said fifth and sixth shuttle openings are common, gasket means for sealing said doors and openings and where each chamber is sealable to provide microbiological isolation, a base for each of the first through fourth chambers, said base including a non-permeable subfloor angled to a sealable waste feedthrough outlet formed in the base to said service corridor and said floor being suspended on said base above said subfloor, clear, laminated glass panels projecting vertically from said base and extending substantially to the respective chamber ceiling, each panel defining selected portions of the wall of said first, second, third, and fourth chambers to permit visual contact of each chamber, and a broad spectrum lighting source disposed above the ceiling of each of said chambers and a clear, colorless panel sealed into said chamber ceilings to permit passage of light from said light source into each chamber, where each chamber has four walls and where the floor is a grate composed of plastic coated aluminum.

31. The animal containment system of claim 30 further comprising;

movable squeeze-back wall means disposed within said first chamber, said squeeze-back means being translatable between a first neutral position and a second position substantially abutting the service corridor opening, and a ventilation system including a plenum and air pressure control means for selectively controlling the air pressure within each chamber to create positive or negative air pressure relative to the ambient pressure and a sealed vent formed in the ceiling of said chambers, said sealed vent being connected to a manifold and including a high efficiency particulate air filter.

* * * * *